US012632128B2

(12) United States Patent
    Wang

(10) Patent No.: US 12,632,128 B2
(45) Date of Patent: May 19, 2026

(54) CONTROL PANEL DEVICE AND METHOD FOR PROVIDING HUMAN-MACHINE INTERFACE WITH AID OF OPTICAL DETECTION

(71) Applicant: PixArt Imaging Inc., Hsin-Chu City (TW)

(72) Inventor: Tsung-Fa Wang, Hsin-Chu City (TW)

(73) Assignee: PixArt Imaging Inc., Hsin-Chu City (TW)

( * ) Notice: Subject to any disclaimer, the term of this patent is extended or adjusted under 35 U.S.C. 154(b) by 123 days.

(21) Appl. No.: 18/744,690

(22) Filed: Jun. 16, 2024

(65) Prior Publication Data

US 2025/0383722 A1     Dec. 18, 2025

(51) Int. Cl.
    *G06F 3/03*       (2006.01)
    *G06F 3/02*       (2006.01)
    *G06F 3/0362*     (2013.01)
(52) U.S. Cl.
    CPC .......... *G06F 3/0304* (2013.01); *G06F 3/0202* (2013.01); *G06F 3/0362* (2013.01)

(58) Field of Classification Search
    CPC ..... G06F 3/0304; G06F 3/0202; G06F 3/0362
    See application file for complete search history.

(56) References Cited

U.S. PATENT DOCUMENTS

| | | | |
|---|---|---|---|
| 10,705,629 B1 * | 7/2020 | Arnold ................ | G06F 3/03547 |
| 2017/0344133 A1 * | 11/2017 | Kang .................... | G06F 3/0362 |
| 2019/0288687 A1 * | 9/2019 | Ju ........................ | H03K 17/968 |

* cited by examiner

*Primary Examiner* — Jonathan A Boyd
(74) *Attorney, Agent, or Firm* — Winston Hsu

(57) ABSTRACT

A control panel device for providing human-machine interface with aid of optical detection and associated method are provided. The control panel device may include a magnetic component that is positioned below a first surface of the control panel device, a moveable component that is positioned above the first surface, and an optical tracking sensor (OTS) that is positioned below the first surface. The moveable component is magnetically attracted by the magnetic component to attach to the first surface. In addition, the OTS may be arranged to sense movement or rotation of the moveable component as at least one user input in order to generate at least one output corresponding to the at least one user input.

20 Claims, 18 Drawing Sheets

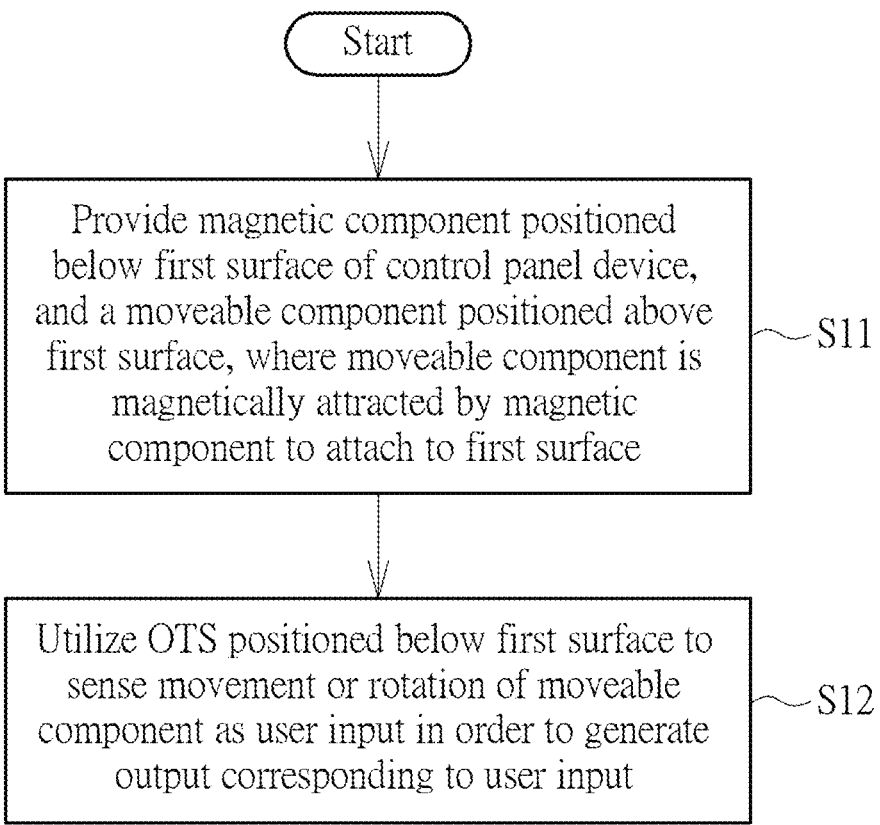

Start

Provide magnetic component positioned below first surface of control panel device, and a moveable component positioned above first surface, where moveable component is magnetically attracted by magnetic component to attach to first surface    ~S11

Utilize OTS positioned below first surface to sense movement or rotation of moveable component as user input in order to generate output corresponding to user input    ~S12

FIG. 16

CONTROL PANEL DEVICE AND METHOD FOR PROVIDING HUMAN-MACHINE INTERFACE WITH AID OF OPTICAL DETECTION

BACKGROUND OF THE INVENTION

1. Field of the Invention

The present invention is related to device control, and more particularly, to a control panel device for providing human-machine interface with aid of optical detection, and an associated method.

2. Description of the Prior Art

According to the related art, when installing a volume knob on a central control panel of an in-vehicle infotainment system, preparing a hole on the central control panel in advance via high-precision machining operations is typically needed to allow the associated structure (e.g., a rotary shaft) to pass through the central control panel, causing the associated costs (e.g., the labor cost and the time cost) to be increased. If the central control panel is implemented as a touch-sensitive display panel, the architecture may become more complicated. As a result, the costs for maintaining or repairing the central control panel may be increased. Thus, a novel method and associated architecture are needed for solving the problems without introducing any side effect or in a way that is less likely to introduce a side effect.

SUMMARY OF THE INVENTION

It is an objective of the present invention to provide a control panel device for providing human-machine interface with aid of optical detection, and an associated method, in order to solve the above-mentioned problems.

At least one embodiment of the present invention provides a control panel device for providing human-machine interface with aid of optical detection. For example, the control panel device may comprise a magnetic component that is positioned below a first surface of the control panel device, a moveable component that is positioned above the first surface, and an optical tracking sensor (OTS) that is positioned below the first surface. The moveable component is magnetically attracted by the magnetic component to attach to the first surface. In addition, the OTS may be arranged to sense movement or rotation of the moveable component as at least one user input in order to generate at least one output corresponding to the at least one user input.

At least one embodiment of the present invention provides a method for providing human-machine interface with aid of optical detection, where the method is applicable to a control panel device. For example, the method may comprise: providing a magnetic component of the control panel device that is positioned below a first surface of the control panel device, and a moveable component of the control panel device that is positioned above the first surface, wherein the moveable component is magnetically attracted by the magnetic component to attach to the first surface; and utilizing an OTS of the control panel device that is positioned below the first surface to sense movement or rotation of the moveable component as at least one user input in order to generate at least one output corresponding to the at least one user input.

According to some embodiments, a main part of the control panel device may comprise a display panel of an electronic device, and the moveable component may be implemented as one or a combination of a knob for rotating/turning and a button for pressing, such as the knob-button (i.e., the combination of the knob and the button), for providing the knob and button functions with the aid of the OTS. For example, the display panel may be implemented as a touch-sensitive display panel.

It is an advantage of the present invention that, through proper design, the control panel device of the present invention can operate correctly with the aid of the OTS, and more particularly, control the associated operations according to the movement or rotation of the moveable component with extremely high resolution. As the moveable component such as the knob-button can be magnetically attracted by the magnetic component to attach to the first surface, it is not required to prepare any hole on the control panel device (or the display panel) in advance. As a result, the associated costs can be reduced. In addition, easy maintenance can be achieved since the moveable component (e.g., the knob-button) is replaceable. The appearance and the size of the knob-button are changeable as long as the sensing area to be sensed by the OTS is fixed. Additionally, as no hole is required for installing the moveable component such as the knob-button, the control panel device can be totally waterproof. In comparison with the related art, the control panel device (or the moveable component therein, such as the knob-button) of the present invention can provide higher resolution with the aid of the OTS to achieve high control accuracy, having no need to prepare any hole for installation in advance, and it is easy to perform the installation, the replacement and the maintenance of the moveable component.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 16 illustrates a flowchart of a method for providing human-machine interface with aid of optical detection according to an embodiment of the present invention.

DETAILED DESCRIPTION

Figure 1:
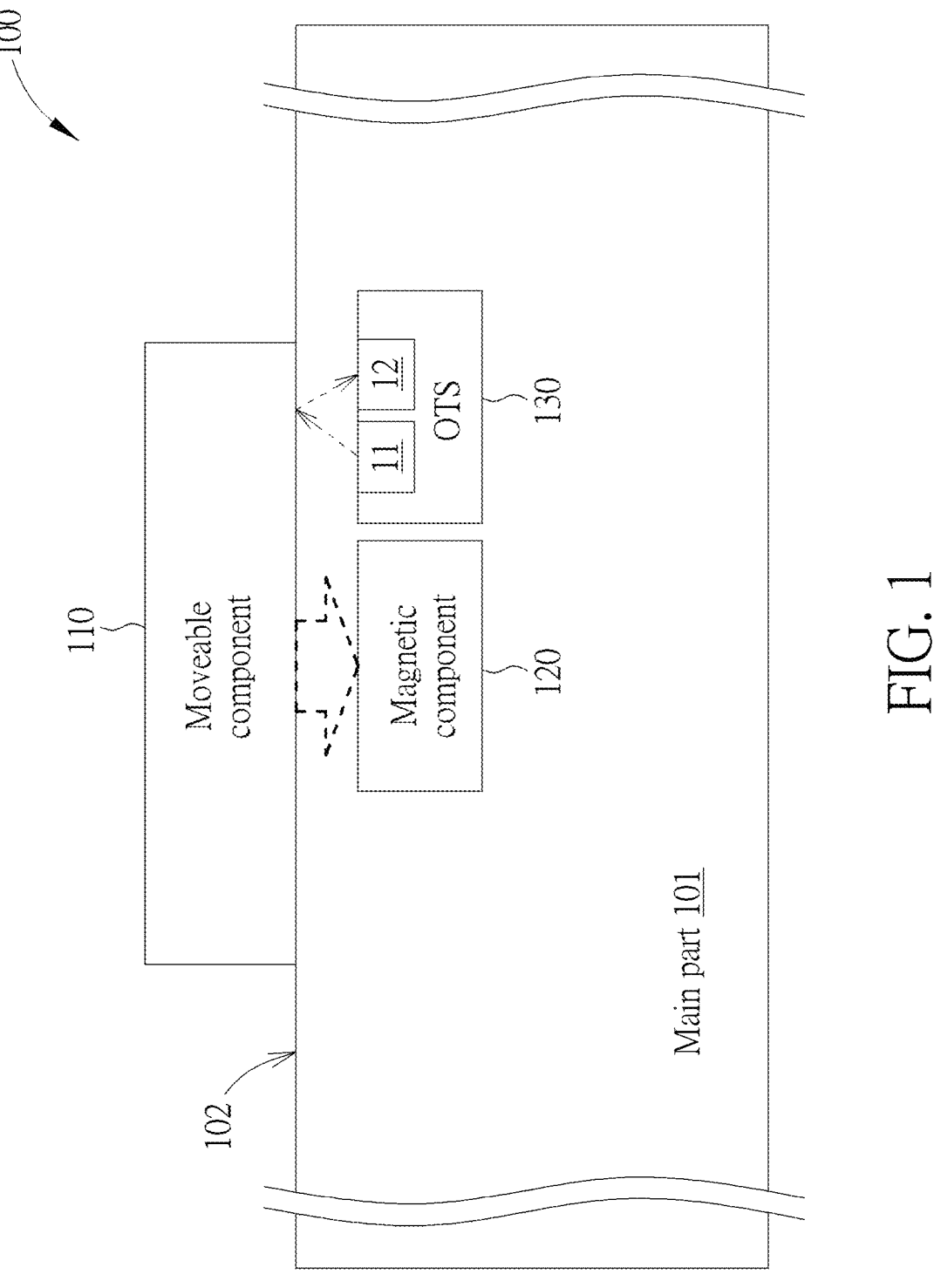
FIG. 1 is a schematic diagram of a control panel device for providing human-machine interface with aid of optical detection according to an embodiment of the invention.

FIG. 1 is a schematic diagram of a control panel device 100 for providing human-machine interface with aid of optical detection according to an embodiment of the invention. The control panel device 100 may comprise a moveable component 110 positioned above a first surface 102 of the control panel device 100, and a magnetic component 120 and an optical tracking sensor (OTS) 130 positioned below the first surface 102, where the moveable component 110 is magnetically attracted by the magnetic component 120 to attach to the first surface 102. The first surface 102 may represent the surface 102 of a main part 101 of the control panel device 100, and the magnetic component 120 and the OTS 130 may be positioned within the main part 101. For example, the magnetic component 120 may comprise at least one first magnet (e.g., one or more first magnets) such as a single first magnet or multiple first magnets. In addition, the OTS 130 may comprise a light emitting device 11 and an image acquisition device 12, and may be arranged to sense movement or rotation of the moveable component 110 as at least one user input (e.g., one or more user inputs) in order to generate at least one output (e.g., one or more outputs) corresponding to the aforementioned at least one user input. Additionally, at least one portion (e.g., a portion or all) of the moveable component 110 is moveable with respect to the first surface 102, for receiving the aforementioned at least one user input for the control panel device 100. More particularly, the aforementioned at least one portion of the moveable component 110 is moveable with respect to the first surface 102, for receiving the aforementioned at least one user input of a user for the control panel device 100 when being moved by the user.

The moveable component 110 is detachable from the first surface 102, and is attachable to the first surface 102 when magnetically attracted by the magnetic component 120. For example, the moveable component 110 may be implemented as one or a combination of a knob for rotating/turning and a button for pressing, such as the knob-button (i.e., the combination of the knob and the button), for providing the knob and button functions with the aid of the OTS 130. As the moveable component 110 is replaceable, easy maintenance can be achieved. In comparison with the related art, the control panel device 100 (or the moveable component 110 therein, such as the knob-button) can provide higher resolution with the aid of the OTS 130 to achieve high control accuracy, having no need to prepare any hole for installation in advance, and it is easy to perform the installation, the replacement and the maintenance of the moveable component 110.

Figure 2:
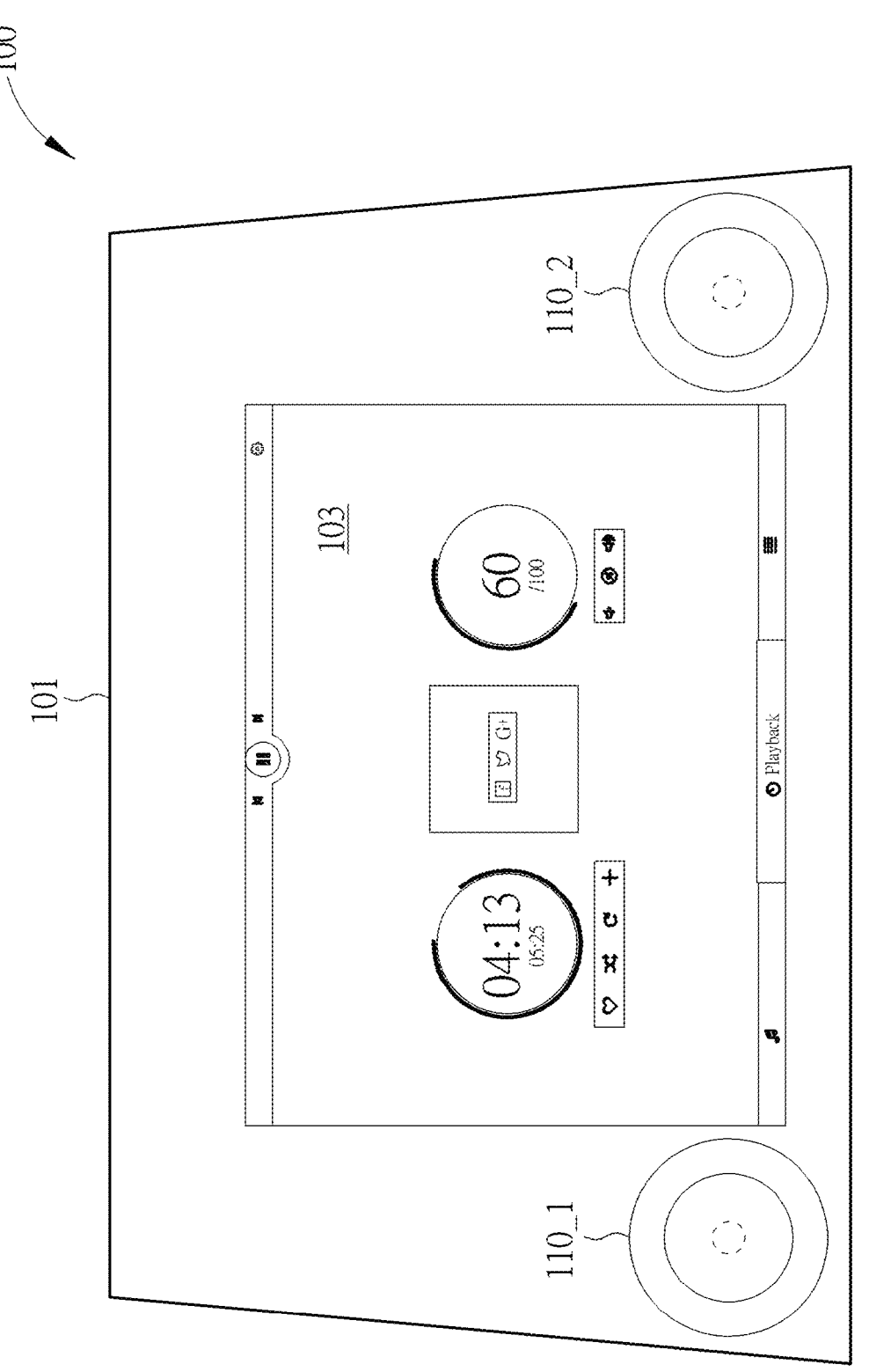
FIG. 2 illustrates a first case in which a main part of the control panel device shown in FIG. 1 comprises a display panel according to an embodiment of the invention.

FIG. 2 illustrates a first case in which the main part 101 of the control panel device 100 shown in FIG. 1 comprises a display panel 103 (e.g., a touch-sensitive display panel) of an electronic device (e.g., an in-car entertainment (ICE) or in-vehicle infotainment (IVI) system) according to an embodiment of the invention, where the moveable component 110 thereof may be implemented as the knob-button mentioned above, for providing both of the knob and button functions such as the rotating/turning and pressing functions with the aid of the OTS 130. For example, the control panel device 100 may comprise multiple moveable components 110, multiple magnetic components 120 and multiple OTSs 130 to form multiple component sets (110, 120, 130) (any component set of which may comprise the moveable component 110, the magnetic component 120 and the OTS 130 shown in FIG. 1), and the multiple moveable components 110 such as the moveable components 110_1 and 110_2 may be implemented as the knob-buttons.

The control panel device 100 can operate correctly with the aid of the OTS 130 shown in FIG. 1, and control the associated operations of the whole system according to the movement or rotation of the moveable component 110 shown in FIG. 1 (e.g., any moveable component 110 among the multiple moveable components 110, such as any of the moveable components 110_1 and 110_2 shown in FIG. 2) with extremely high resolution, and more particularly, utilize the main part 101 (or the display panel 103 therein) to display at least one indication corresponding to the aforementioned at least one user input, such as a volume level indication for indicating the volume level adjusted by the user and the brightness level (which is acting as a brightness level indication) adjusted by the user, where the aforementioned at least one output may comprise the aforementioned at least one indication. As the moveable component 110 such as the knob-button can be magnetically attracted by the magnetic component 120 to attach to the first surface 102, it is not required to prepare any hole on the control panel device 100 (or the display panel 103) in advance. As a result, the associated costs can be reduced. In addition, easy maintenance can be achieved since the moveable component 110 (e.g., the knob-button) is replaceable. The appearance and the size of the knob-button are changeable as long as the sensing area to be sensed by the OTS 130 is fixed. Additionally, as no hole is required for installing the moveable component 110 such as the knob-button, the control panel device 100 can be totally waterproof.

Figure 3:
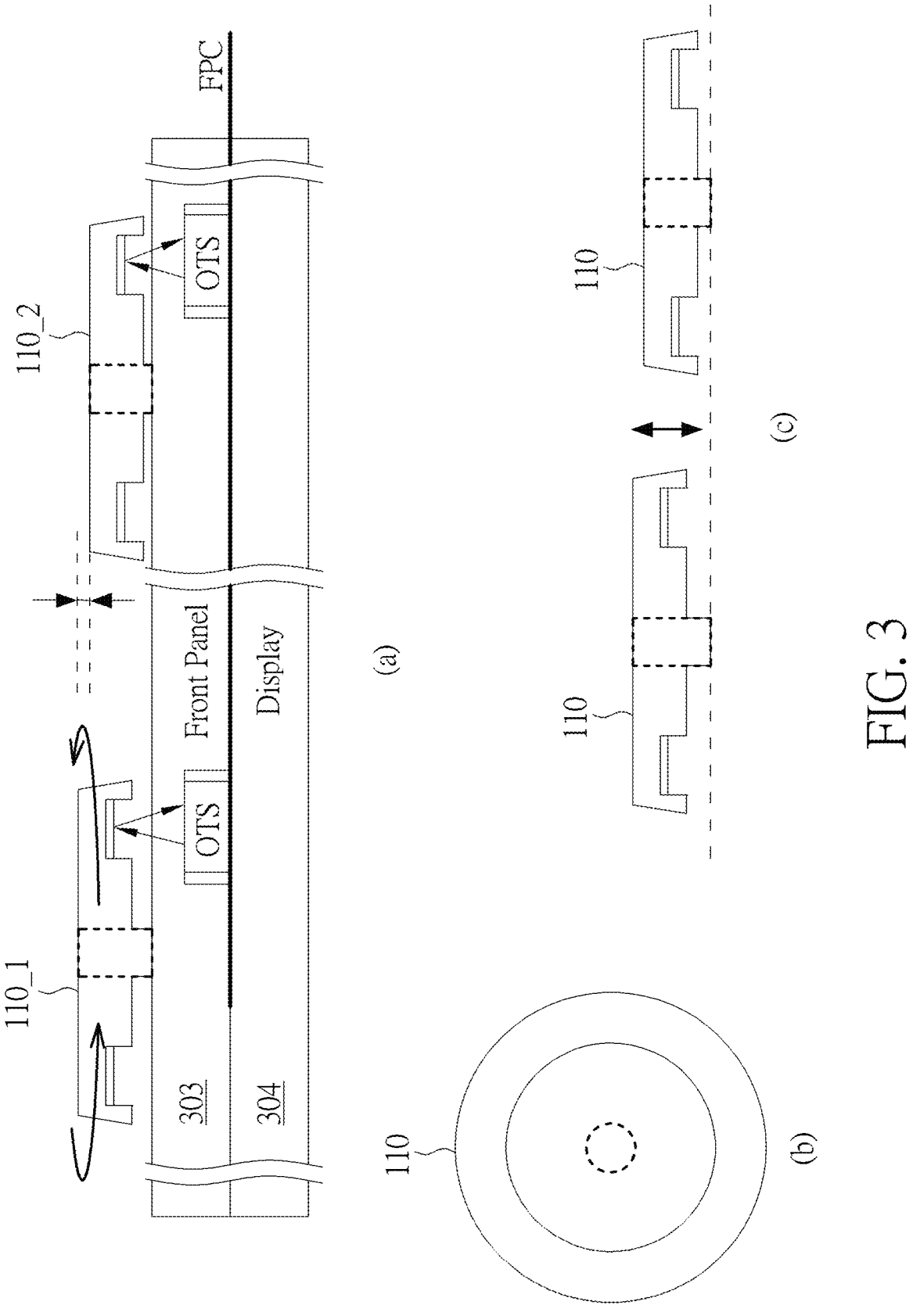
FIG. 3 illustrates, in sub-diagrams (a), (b) and (c) thereof, a sectional view of the control panel device shown in FIG. 1, a bottom/top view and a sectional view of the moveable component thereof in the first case according to an embodiment of the invention, respectively.

FIG. 3 illustrates, in sub-diagrams (a), (b) and (c) thereof, a sectional view of the control panel device 100 shown in FIG. 1, a bottom/top view and a sectional view of the moveable component 110 thereof in the first case according to an embodiment of the invention, respectively, where the main part 101 thereof may comprise a front panel 303 for covering and protecting the display panel 103 such as the display panel 304 as shown in the sub-diagram (a) of FIG. 3. For example, the front panel 303 may be made of glass or infrared (IR) pass materials, and the OTS 130 may be integrated into the front panel 303, and may be coupled to a controller (e.g., a microcontroller, or microcontroller unit (MCU)) within the control panel device 100 via a flexible printed circuit (FPC), to allow the controller to receive the output of the OTS 130. More particularly, the controller may monitor the user input according to the output of the OTS 130 in order to display at least one indication corresponding to the at least one user input. For the first case in which the main part 101 of the control panel device 100 shown in FIG. 1 comprises the display panel 103, the aforementioned at least one indication may be displayed with the display panel 103 such as the display panel 304 shown in FIG. 3. According to some viewpoints, the aforementioned at least one output may comprise the output of the OTS 130 and/or the aforementioned at least one indication.

As shown in the sub-diagram (b), the moveable component 110 (e.g., any of the moveable components 110_1 and 110_2) is symmetrical in the bottom/top view with respect to the center thereof. Regarding the rotating/turning of the moveable component 110, the moveable component 110 may freely rotate with respect to the symmetrical axis thereof (e.g., the axis passing through the center of the moveable component 110 shown in the sub-diagram (b)), for providing the knob function such as the rotating/turning with the aid of the OTS 130, for example, for navigation and associated control. Regarding the pressing of the moveable component 110, the moveable component 110 may freely move up or down with respect to the symmetrical axis thereof as shown in the sub-diagram (c), for providing the button function such as the pressing function with the aid of the OTS 130, for example, for controlling brightness, brightness difference, etc.

Figure 4:
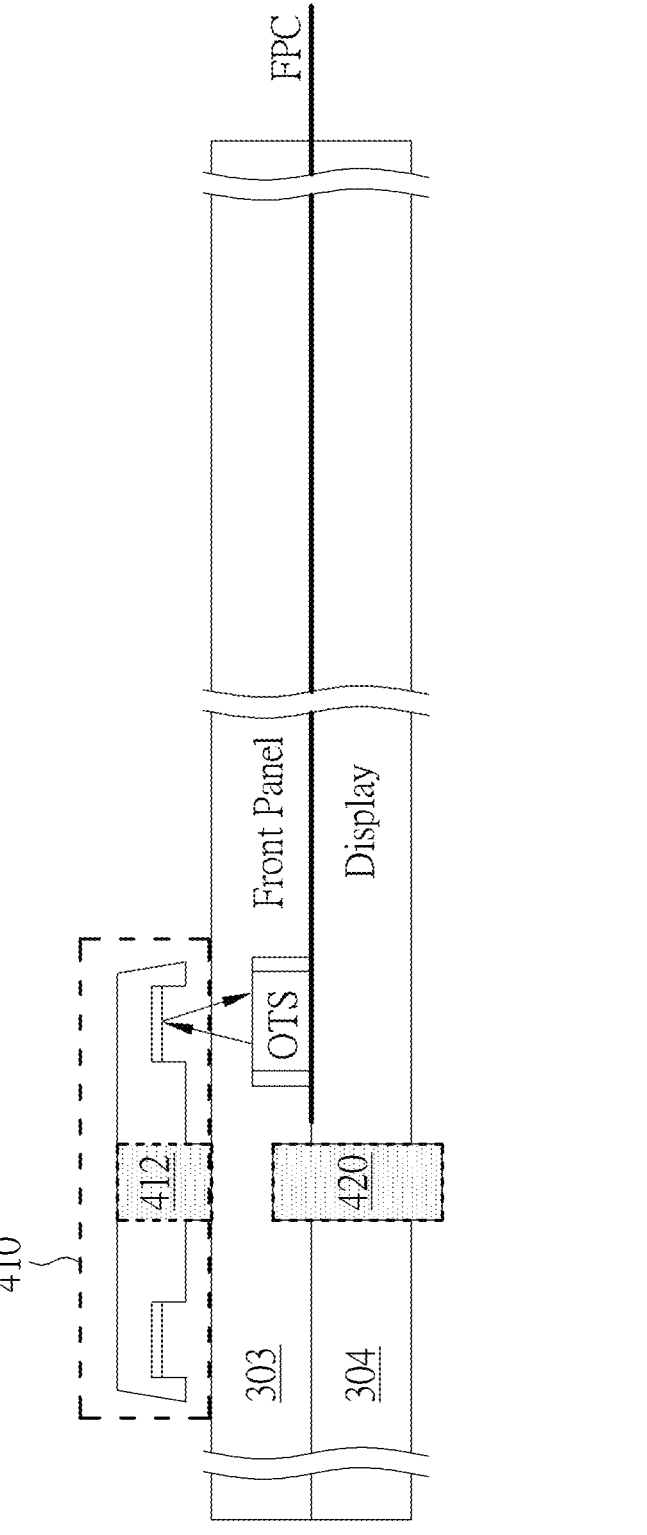
FIG. 4 illustrates a sectional view of the control panel device shown in FIG. 1 in the first case according to another embodiment of the invention.

FIG. 4 illustrates a sectional view of the control panel device 100 shown in FIG. 1 in the first case according to another embodiment of the invention. For example, the moveable component 110 such as the moveable component 410 may be implemented as the knob-button, and may comprise at least one second magnet (e.g., one or more second magnets, such as a single second magnet or multiple second magnets), which may be collectively referred to as the second magnet 412. The magnetic component 120 may comprise the aforementioned at least one first magnet (e.g., the one or more first magnets), which may be collectively referred to as the first magnet 420.

Figure 5:
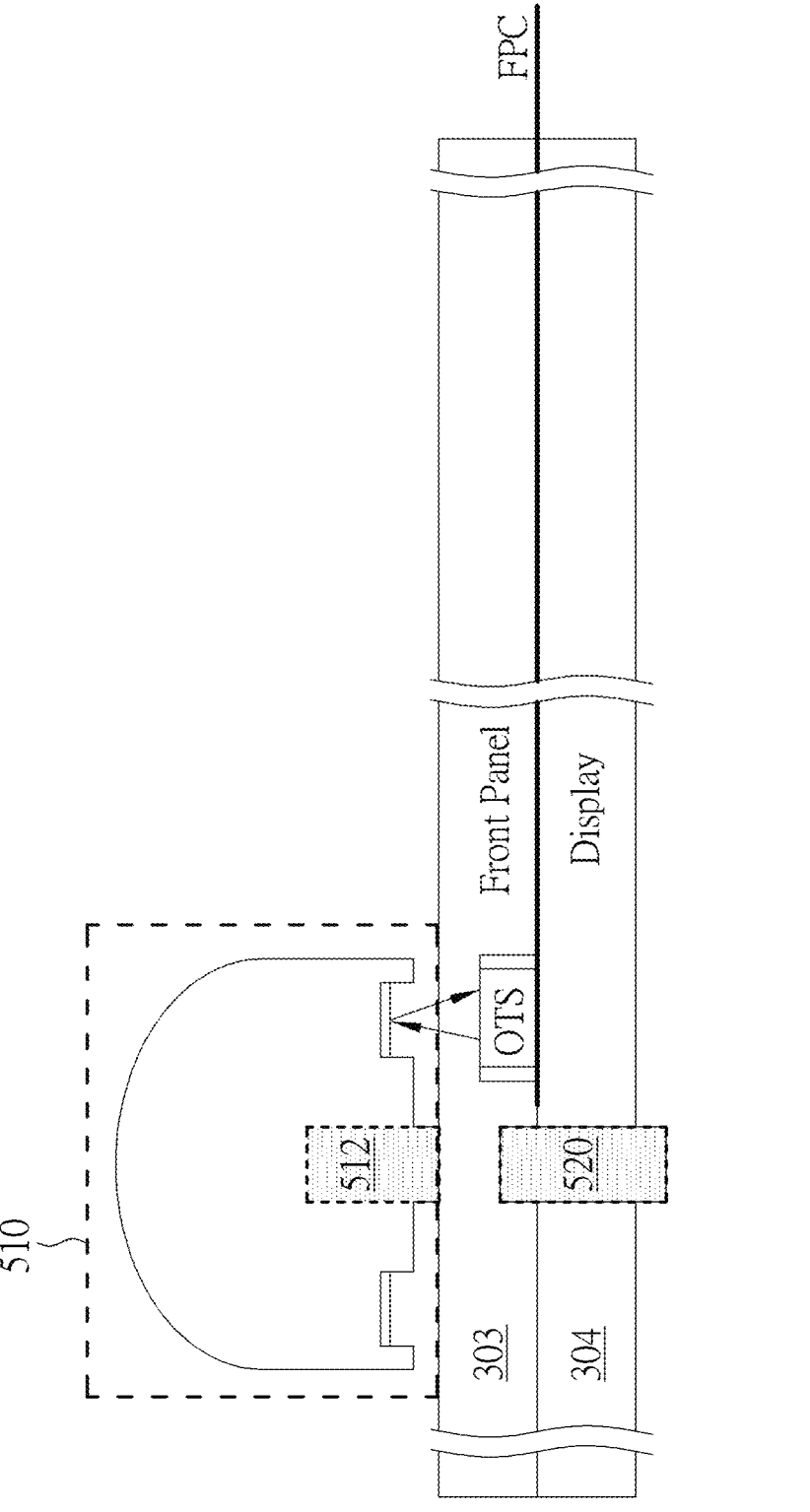
FIG. 5 illustrates a sectional view of the control panel device shown in FIG. 1 in the first case according to yet another embodiment of the invention.

FIG. 5 illustrates a sectional view of the control panel device 100 shown in FIG. 1 in the first case according to yet another embodiment of the invention. For example, the moveable component 110 such as the moveable component 510 may be implemented as the knob-button. In comparison with the moveable component 410 shown in FIG. 4, the shape and the size of the moveable component 510 have been changed, and the second magnet 412 may be replaced with the second magnet 512 in response to the change of the moveable component 510, and more particularly, the first magnet 420 may be replaced with the first magnet 520 in response to the change of the moveable component 510 (or the second magnet 512).

Figure 6:
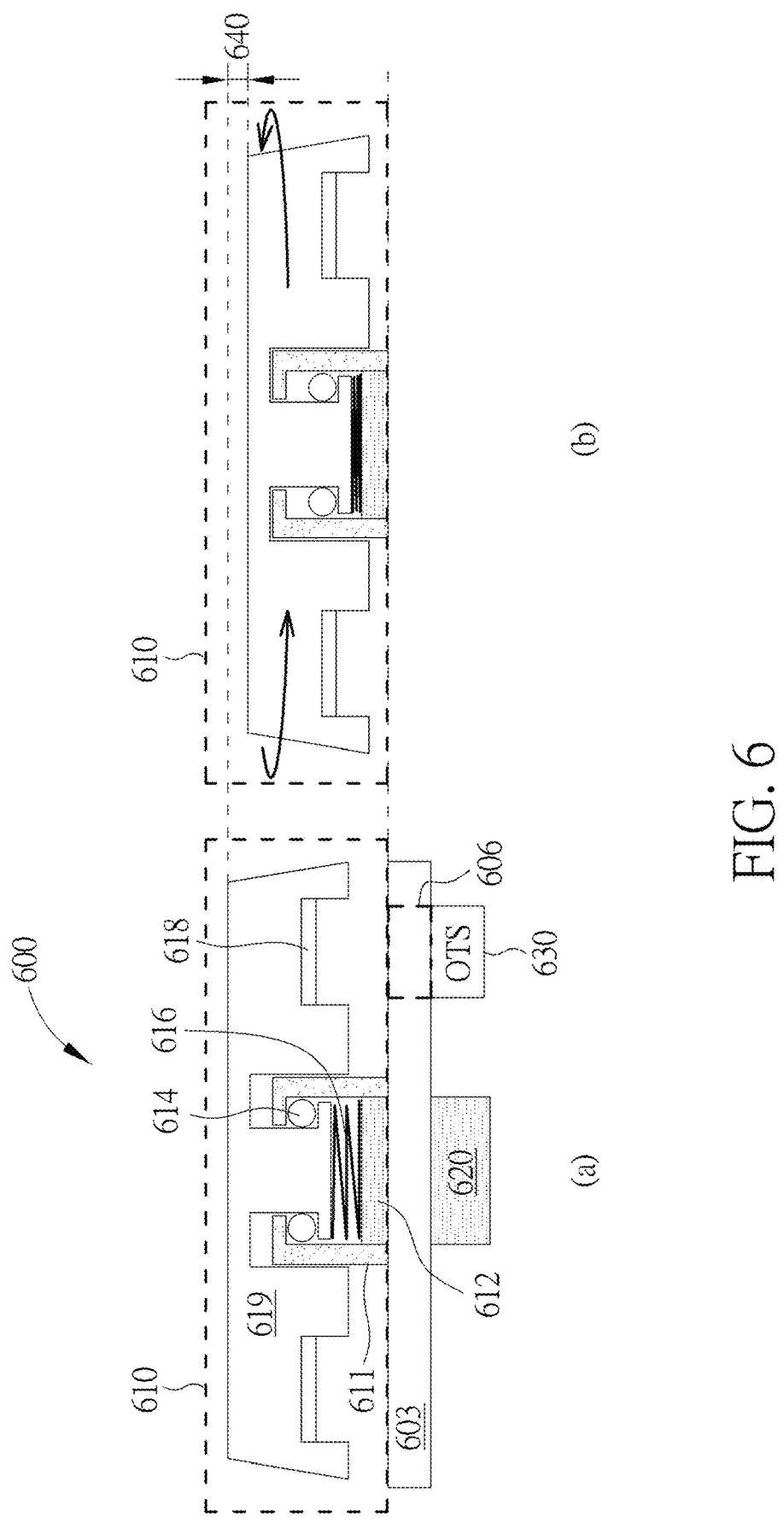
FIG. 6 illustrates, in sub-diagrams (a) and (b) thereof, a sectional view of the control panel device shown in FIG. 1 and a sectional view of the moveable component thereof regarding a first type according to an embodiment of the invention, respectively.

FIG. 6 illustrates, in sub-diagrams (a) and (b) thereof, a sectional view of the control panel device 100 shown in FIG. 1 and a sectional view of the moveable component 110 thereof regarding a first type (e.g., a one-dimensional (1D) rotatable/turnable and pressable type) according to an embodiment of the invention, respectively, where the control panel device 600 can be taken as an example of the control panel device 100 shown in FIG. 1, and the moveable component 110 such as the moveable component 610 may be implemented as the knob-button. For better comprehension, the front panel 603, the second magnet 612, the first magnet 620 and the OTS 630 shown in FIG. 6 can be taken as examples of the front panel 303 shown in FIG. 3, the aforementioned at least one second magnet, the aforementioned at least one first magnet and the OTS 130 such as any OTS among the OTSs shown in FIG. 3, respectively. In comparison with the moveable component 110 shown in FIG. 3 (or the moveable component 410 shown in FIG. 4), the moveable component 610 may be illustrated to comprise more detailed structures such as the ball bearings 614 for the rotating/turning function, the spring 616 for the pressing function and the OTS sensing area 618 for the surface sensing by the OTS 630.

As shown in the sub-diagram (a) of FIG. 6, the moveable component 610 may comprise the base 611 and the moveable sub-component 619. The base 611 is magnetically attracted by the magnetic component 120, and more particularly, the aforementioned at least one first magnet thereof such as the first magnet 620, to attach to the aforementioned first surface 102 such as the upper surface of the front panel 603. In addition, the moveable sub-component 619 is supported by the base 611, moveable with respect to the aforementioned first surface 102 such as the upper surface of the front panel 603, for receiving the aforementioned at least one user input for the control panel device 600. Additionally, the front panel 603, or at least the partial front panel 606 thereof, may be made of glass or IR pass materials, and the OTS 630 may be integrated into or attached onto the front panel 603, and may be coupled to the controller mentioned above via the FPC, to allow the controller to receive the output of the OTS 630. As shown in the sub-diagram (b) of FIG. 6, the moveable sub-component 619 is moveable (or pressable) along the symmetrical axis thereof within a predetermined distance 640.

As shown in FIG. 6, the base 611 may comprise the second magnet 612, but the present invention is not limited thereto. According to some embodiments, the base 611 may comprise one or a combination of at least one ferromagnetic material and a set of magnets. In addition, the moveable sub-component 611 is moveable with respect to the symmetrical axis thereof, but the present invention is not limited thereto. According to some embodiments, the moveable sub-component 611 may be moveable with respect to at least one axis (e.g., one or more axes) such as a single axis or multiple axes. For example, the moveable sub-component 611 may be rotatable with respect to a first axis (e.g., the symmetrical axis mentioned above) among the aforementioned at least one axis, and more particularly, may be pressable along the first axis and/or shiftable along the first axis. In some examples, no matter whether the moveable sub-component 611 is rotatable with respect to the first axis or not, the moveable sub-component 611 may be pressable along the first axis and/or shiftable along the first axis. For another example, the moveable sub-component 611 may be rotatable with respect to the first axis among the aforementioned at least one axis, and may also be rotatable with respect to a second axis among the aforementioned at least one axis.

Figure 7:
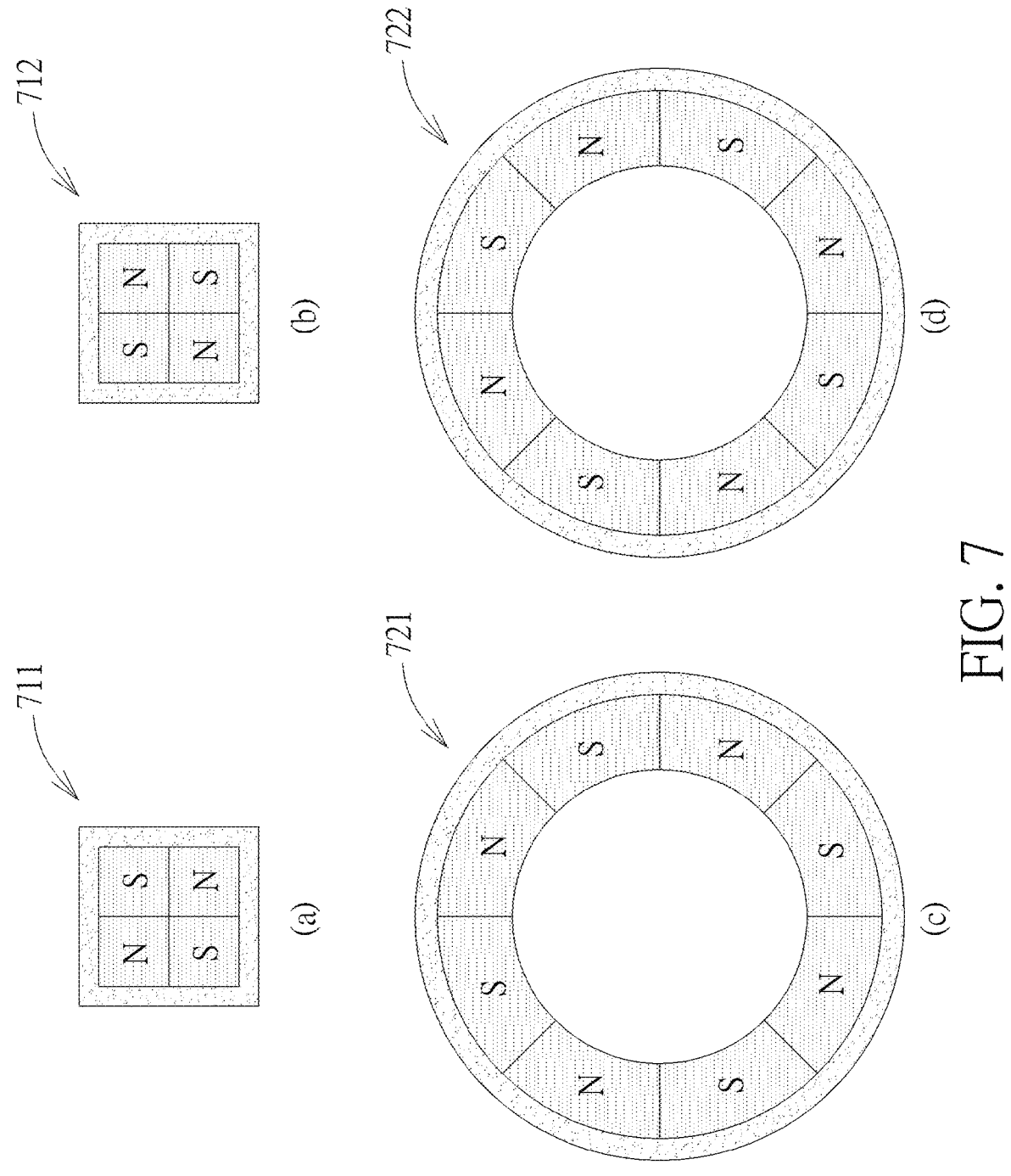
FIG. 7 illustrates, in sub-diagrams (a), (b), (c) and (d) thereof, a first predetermined magnet arrangement pattern, a second predetermined magnet arrangement pattern corresponding to the first predetermined magnet arrangement pattern, another first predetermined magnet arrangement pattern and another second predetermined magnet arrangement pattern corresponding to the other first predetermined magnet arrangement pattern for aligning the moveable component shown in FIG. 1 to a predetermined direction according to an embodiment of the invention, respectively.

FIG. 7 illustrates, in sub-diagrams (a), (b), (c) and (d) thereof, a first predetermined magnet arrangement pattern 711, a second predetermined magnet arrangement pattern 712 corresponding to the first predetermined magnet arrangement pattern 711, another first predetermined magnet arrangement pattern 721 and another second predetermined magnet arrangement pattern 722 corresponding to the other first predetermined magnet arrangement pattern 721 for aligning the moveable component 110 shown in FIG. 1 to a predetermined direction according to an embodiment of the invention, respectively. For example, the magnetic component 120 may comprise the multiple first magnets, and the moveable component 110 may comprise the multiple second magnets. Regarding the sub-diagrams (a) and (b), the multiple first magnets such as four first magnets may be arranged according to the first predetermined magnet arrangement pattern 711, and the multiple second magnets such as four second magnets may be arranged according to the second predetermined magnet arrangement pattern 712 corresponding to the first predetermined magnet arrangement pattern 711, for aligning the moveable component 110 to a first predetermined direction on the first surface 102 when the moveable component 110 is magnetically attracted by the magnetic component 120. Regarding the sub-diagrams (c) and (d), the multiple first magnets such as eight first magnets may be arranged according to the other first predetermined magnet arrangement pattern 721, and the multiple second magnets such as eight second magnets may be arranged according to the other second predetermined magnet arrangement pattern 722 corresponding to the other first predetermined magnet arrangement pattern 721, for aligning the moveable component 110 to the first predetermined direction on the first surface 102 when the moveable component 110 is magnetically attracted by the magnetic component 120. According to some embodiments, the multiple first magnets, the multiple second magnets, the magnet count of the multiple first magnets, and/or the magnet count of the multiple second magnets may vary.

Figure 8:
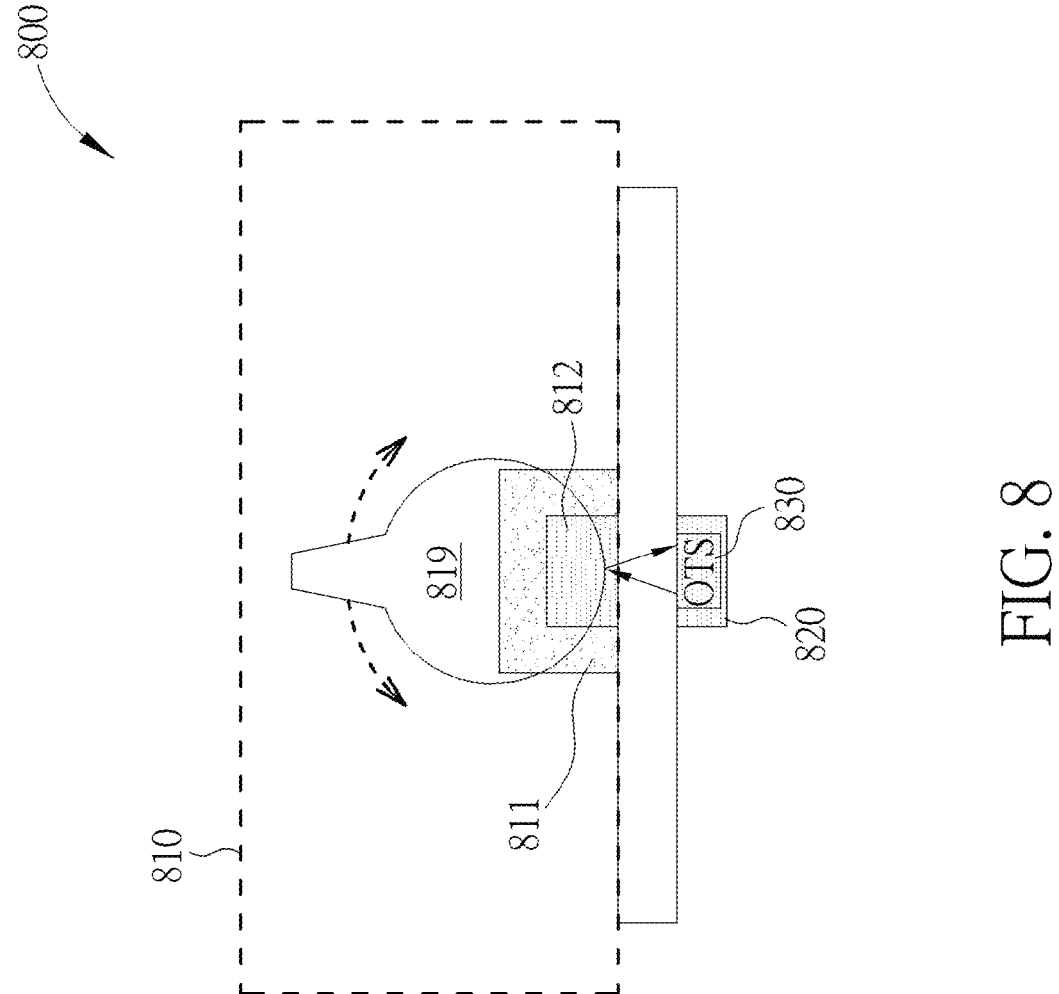
FIG. 8 illustrates a sectional view of a control panel device regarding a second type according to an embodiment of the invention.

FIG. 8 illustrates a sectional view of a control panel device 800 regarding a second type (e.g., a 1D rotatable/swingable type) according to an embodiment of the invention, where the control panel device 800 can be taken as an example of the control panel device 100 shown in FIG. 1, and the moveable component 110 such as the moveable component 810 may be implemented as the swingable controller. In response to the change in the architecture, the base 611, the second magnet 612, the moveable sub-component 619, the first magnet 620 and the OTS 630 mentioned above may be replaced with the base 811, the second magnet 812, the moveable sub-component 819, the first magnet 820 and the OTS 830, respectively. In addition, the moveable sub-component 819 may be moveable with respect to the aforementioned at least one axis such as the single axis. For example, the moveable sub-component 819 may be rotatable with respect to the first axis (e.g., the symmetrical axis of the main and circular part of the moveable sub-component 819, such as the axis passing through the center of the main and circular part). For brevity, similar descriptions for this embodiment are not repeated in detail here.

According to another embodiment, the base 811 may be upgraded to further comprise at least one pressable sub-component that is the same as or similar to the pressable sub-component (e.g., a combination of the spring 616, the central extending structure of the moveable sub-component 619 that is put on the spring 616, and the partial structure of the base 611 that forms the room for pressing) of the moveable component 610 shown in FIG. 6, to allow the moveable sub-component 819 to be pressable along another axis (e.g., the axis parallel to the normal vector of the first surface 102). For brevity, similar descriptions for this embodiment are not repeated in detail here.

Figure 9:
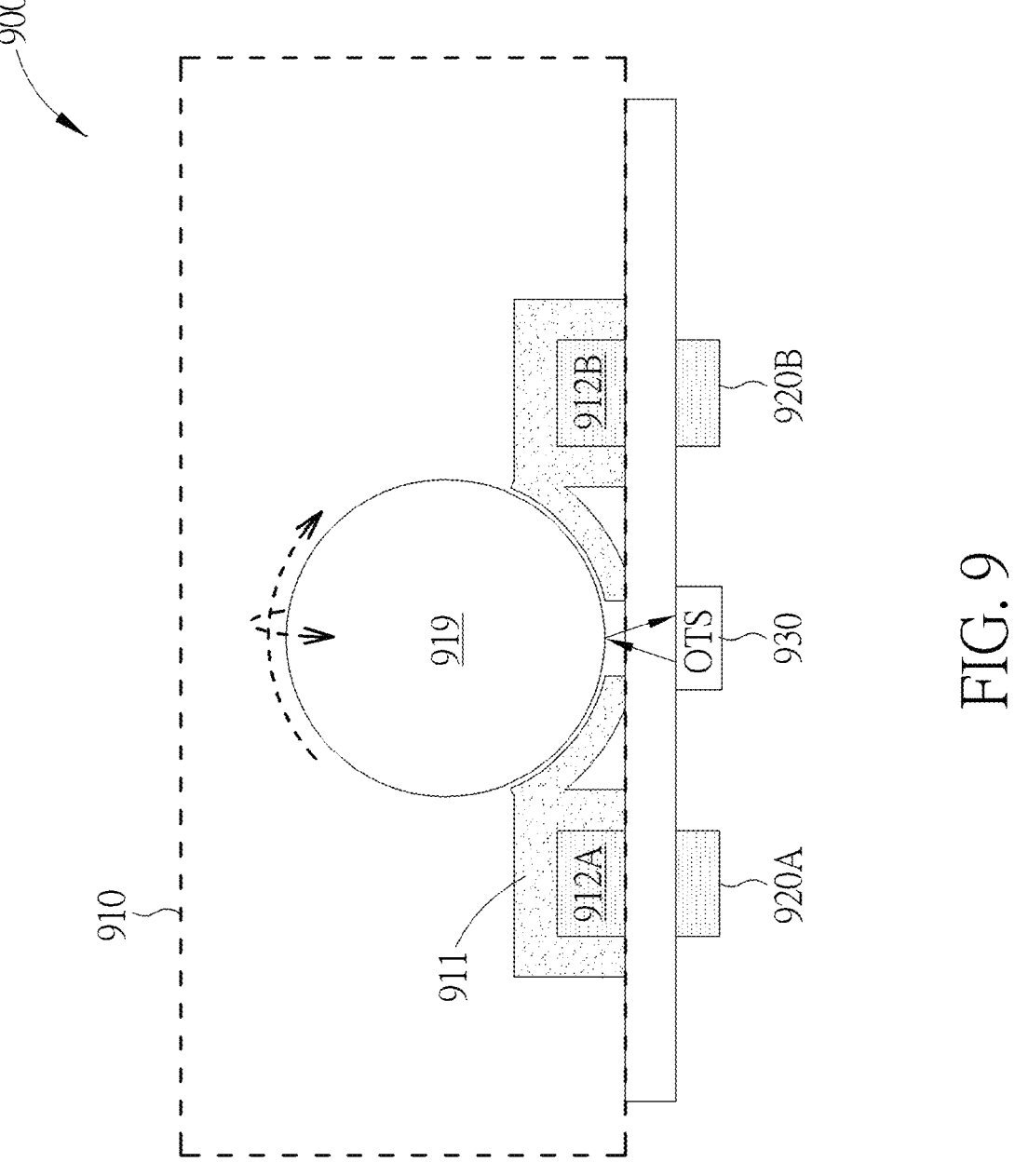
FIG. 9 illustrates a sectional view of a control panel device regarding a third type according to an embodiment of the invention.

FIG. 9 illustrates a sectional view of a control panel device 900 regarding a third type (e.g., a two-dimensional (2D) rotatable/rollable type) according to an embodiment of the invention, where the control panel device 900 can be taken as an example of the control panel device 100 shown in FIG. 1, and the moveable component 110 such as the moveable component 910 may be implemented as the trackball. In response to the change in the architecture, the base 611, the second magnet 612, the moveable sub-component 619, the first magnet 620 and the OTS 630 mentioned above may be replaced with the base 911, the second magnets 912A and 912B, the moveable sub-component 919, the first magnets 920A and 920B and the OTS 930, respectively. In addition, the moveable sub-component 911 may be moveable with respect to the aforementioned at least one axis such as the multiple axes. For example, the moveable sub-component 911 may be rotatable with respect to the first axis, and may also be rotatable with respect to the second axis. For brevity, similar descriptions for this embodiment are not repeated in detail here.

According to another embodiment, the base 911 may be upgraded to further comprise the aforementioned at least one pressable sub-component such as multiple pressable sub-components, to allow the moveable sub-component 919 to be pressable along another axis (e.g., the axis parallel to the normal vector of the first surface 102). For brevity, similar descriptions for this embodiment are not repeated in detail here.

Figure 10:
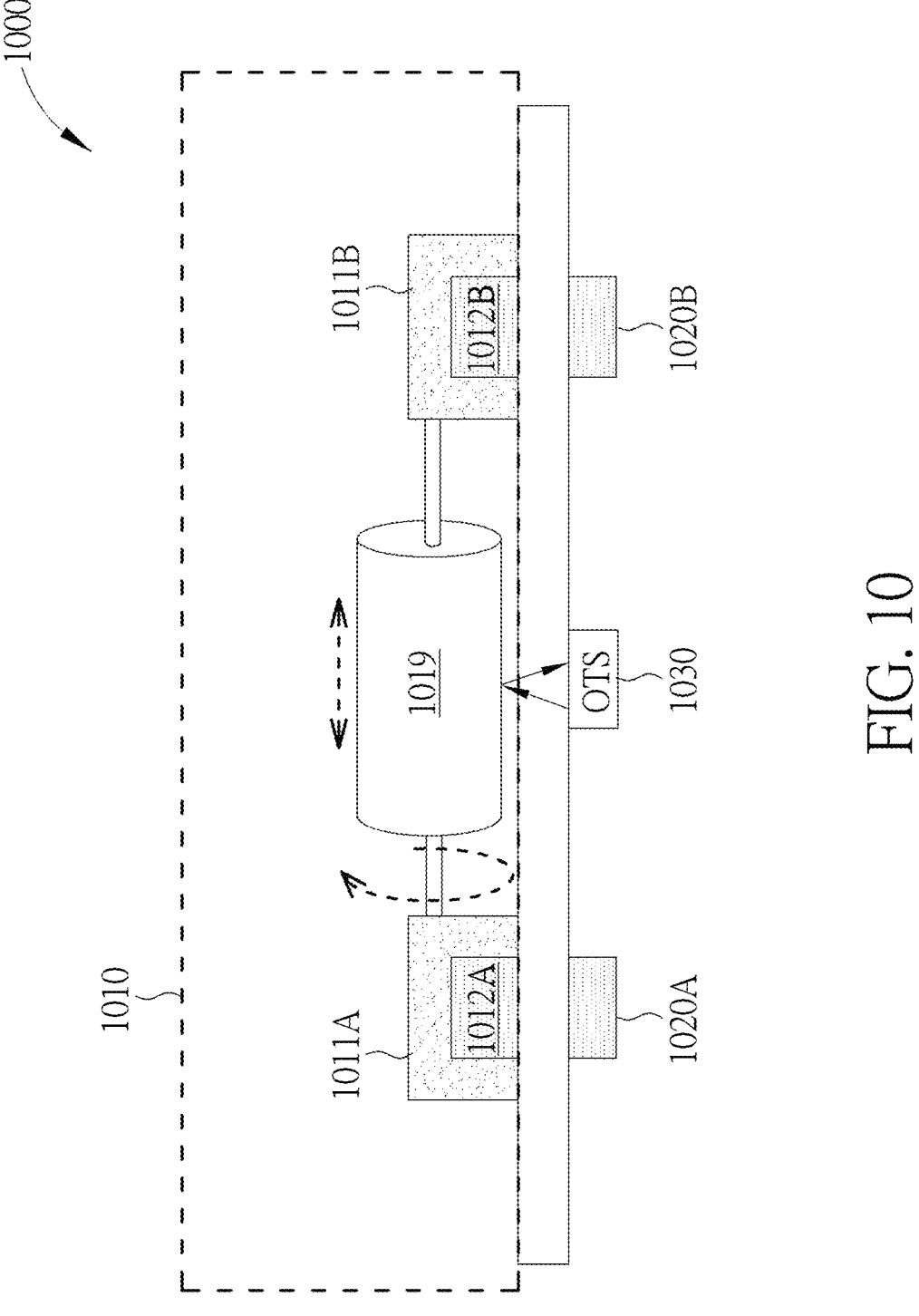
FIG. 10 illustrates a sectional view of a control panel device regarding a fourth type according to an embodiment of the invention.

FIG. 10 illustrates a sectional view of a control panel device 1000 regarding a fourth type (e.g., a 1D rotatable/rollable and shiftable type) according to an embodiment of the invention, where the control panel device 1000 can be taken as an example of the control panel device 100 shown in FIG. 1, and the moveable component 110 such as the moveable component 1010 may be implemented as the roller. In response to the change in the architecture, the base 611, the second magnet 612, the moveable sub-component 619, the first magnet 620 and the OTS 630 mentioned above may be replaced with the bases 1011A and 1011B, the second magnets 1012A and 1012B, the moveable sub-component 1019, the first magnets 1020A and 1020B and the OTS 1030, respectively. In addition, the moveable sub-component 1019 may be moveable with respect to the aforementioned at least one axis such as the single axis. For example, the moveable sub-component 1019 may be rotatable with respect to the first axis (e.g., the symmetrical axis of the moveable sub-component 1019), and more particularly, may be shiftable along the first axis. Regarding the shifting function of the moveable component 1010, the bases 1011A and 1011B may comprise a set of shiftable sub-components installed at the two sides of the moveable sub-component 1019 on the bases 1011A and 1011B, respectively, and any shiftable sub-component among the set of shiftable sub-components may be the same as or similar to the aforementioned pressable sub-component of the moveable component 610 shown in FIG. 6 with the installation direction being changed (with a rotation of 90 degrees on the diagram) for converting the pressing function into the shifting function, to allow the moveable sub-component 1019 to be shiftable along the first axis. For brevity, similar descriptions for this embodiment are not repeated in detail here.

According to another embodiment, the bases 1011A and 1011B may be upgraded to further comprise the aforementioned at least one pressable sub-component such as the multiple pressable sub-components, to allow the moveable sub-component 1019 to be pressable along another axis (e.g., the axis parallel to the normal vector of the first surface 102). For brevity, similar descriptions for this embodiment are not repeated in detail here.

According to another embodiment, the base 811 in the control panel device 800 shown in FIG. 8 may be upgraded to further comprise at least one shiftable sub-component among the set of shiftable sub-components, to allow the moveable sub-component 819 to be shiftable along another axis (e.g., the axis perpendicular to the first axis on the first surface 102). For brevity, similar descriptions for this embodiment are not repeated in detail here.

According to another embodiment, the base 911 in the control panel device 900 shown in FIG. 9 may be upgraded to further comprise the set of shiftable sub-components, to allow the moveable sub-component 919 to be shiftable along a predetermined axis (e.g., one of the first and the second axes, or another axis perpendicular to the normal vector of the first surface 102). For brevity, similar descriptions for this embodiment are not repeated in detail here.

Figure 11:
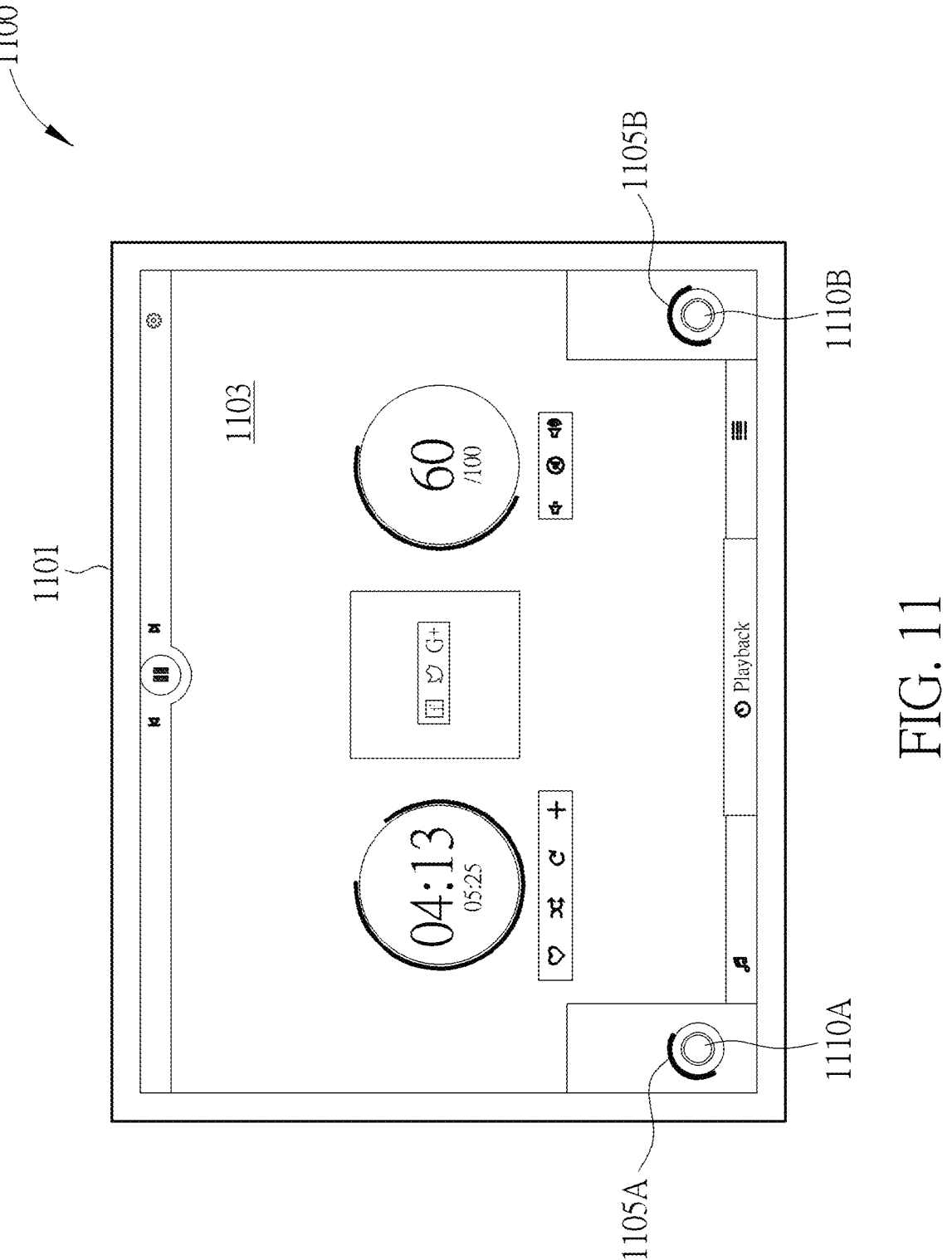
FIG. 11 illustrates a set of moveable component integrated into a display area of the display panel in the first case according to an embodiment of the invention.

FIG. 11 illustrates a set of moveable components 1110A and 1110B integrated into the display area of the display panel 1103 in the first case according to an embodiment of the invention, where the control panel device 1100 can be taken as an example of the control panel device 100 shown in FIG. 1, and the multiple moveable components 110 such as the set of moveable components 1110A and 1110B may be implemented as the knob-buttons. In comparison with the control panel device 100 shown in FIG. 2, the shape and the size of the main part 1101 within the control panel device 1100 have been changed, and the set of moveable components 1110A and 1110B have been integrated into the display area of the display panel 1103. The control panel device 1100 can utilize the main part 1101 (or the display panel 1103 therein) to display the aforementioned at least one indication corresponding to the aforementioned at least one user input, such as the indications 1105A and 1105B surrounding and/or next to the moveable components 1110A and 1110B, respectively. Examples of the indications 1105A and 1105B may include, but are not limited to: the volume level indication for indicating the volume level adjusted by the user, and the brightness level indication for indicating the brightness level adjusted by the user. For brevity, similar descriptions for this embodiment are not repeated in detail here.

According to some embodiments, the main part 101 shown in FIG. 1, such as the main part 1101 shown in FIG. 11, may comprise the multiple moveable components 110 such as the moveable components 1110A and 1110B and the multiple OTSs 130, and further comprise the display panel 1103 of the electronic device (e.g., the ICE or IVI system) at which the control panel device 100 such as the control panel device 1100 is installed, for displaying the aforementioned at least one indication thereon, but the present invention is not limited thereto. According to some embodiments, the main part 101 may comprise at least one magnetic component 120 and at least one OTS 130, and further comprise at least one visible light emitting device, where the aforementioned at least one indication is displayed with the aforementioned at least one visible light emitting device.

Figure 12:
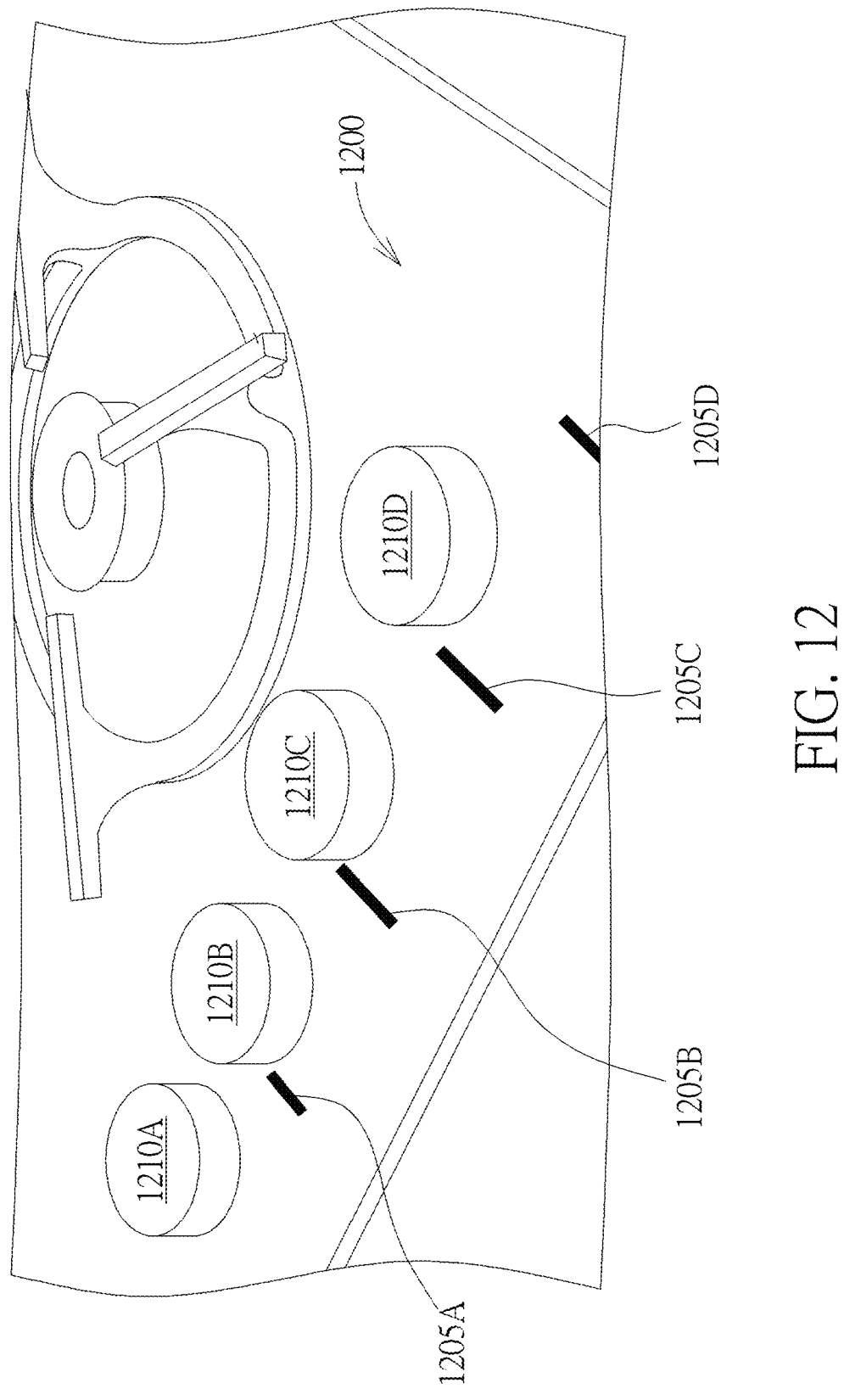
FIG. 12 illustrates a second case in which the main part of the control panel device shown in FIG. 1 comprises at least one visible light emitting device according to an embodiment of the invention.

FIG. 12 illustrates a second case in which the main part 101 of the control panel device 100 shown in FIG. 1 comprises the aforementioned at least one visible light emitting device of a first device according to an embodiment of the invention, where the control panel device 1200 can be taken as an example of the control panel device 100 shown in FIG. 1, and the multiple moveable components 110 such as a set of moveable components 1210A, 1210B, 1210C and 1210D may be implemented as the knob-buttons. For better comprehension, the first device at which the control panel device 100 such as the control panel device 1200 is installed may be implemented as a cooking device such as a gas stove, but the present invention is not limited thereto. According to some embodiments, the first device may be implemented as an electric device such as an electric stove (e.g., a resistive heating device and an induction cooktop), a coffee maker, a refrigerator (e.g., a refrigerator-freezer, a combination of a refrigerator and a freezer), a host device (e.g., an audio video (AV) receiver) of a home theater system, or any other type of electric device.

The control panel device 1200 can utilize the main part (or the aforementioned at least one visible light emitting device therein) of the control panel device 1200 to display the aforementioned at least one indication corresponding to the aforementioned at least one user input, such as the indications 1205A, 1205B, 1205C and 1205D surrounding and/or next to the moveable components 1210A, 1210B, 1210C and 1210D, respectively. The aforementioned at least one visible light emitting device may be implemented by way of light-emitting diode (LED), organic light-emitting diode (OLED), etc. Examples of the indications 1205A, 1205B, 1205C and 1205D may include, but are not limited to: the power level indication for indicating the power level adjusted by the user. For brevity, similar descriptions for this embodiment are not repeated in detail here.

Figure 13:
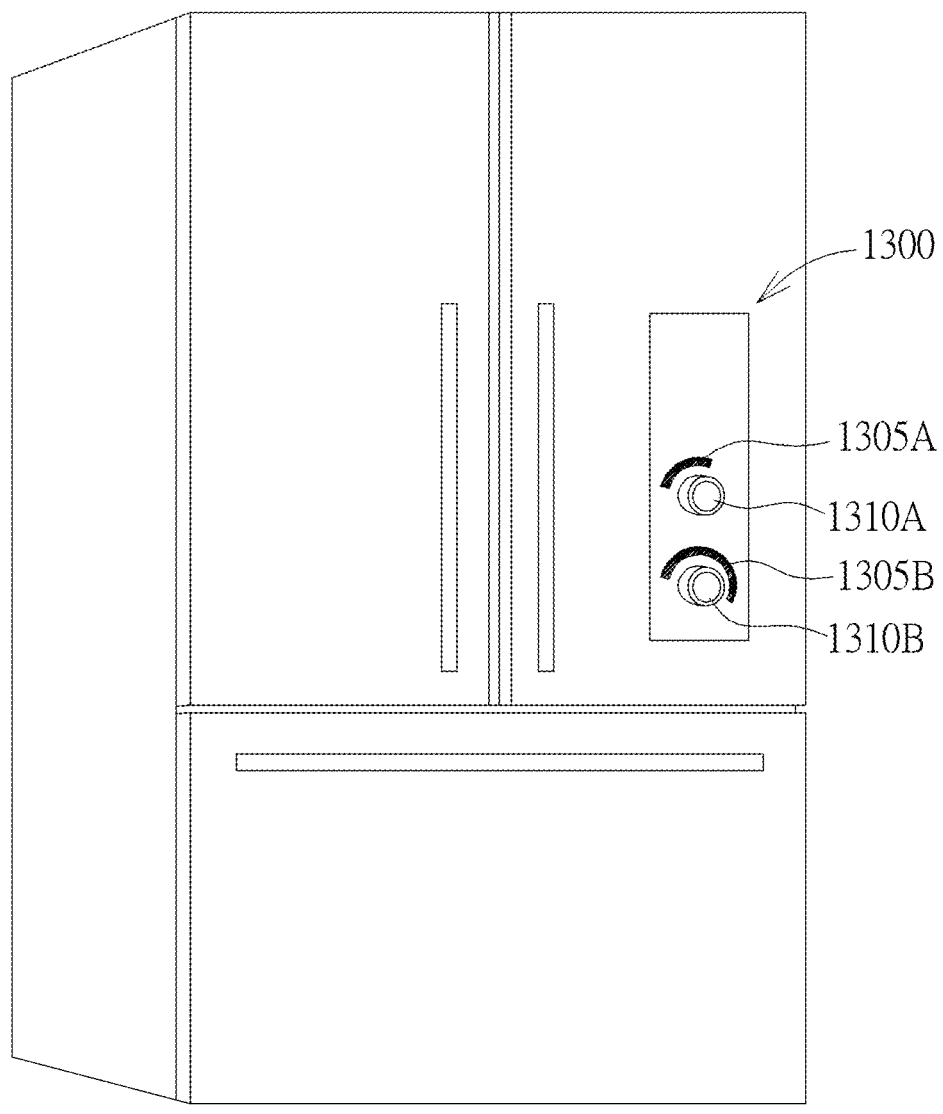
FIG. 13 illustrates a set of moveable component integrated into the display area of the display panel in the first case according to another embodiment of the invention.

FIG. 13 illustrates a set of moveable components 1310A and 1310B integrated into the display area of the display panel in the first case according to another embodiment of the invention, where the control panel device 1300 can be taken as an example of the control panel device 100 shown in FIG. 1, and the multiple moveable components 110 such as the set of moveable components 1310A and 1310B may be implemented as the knob-buttons. For better comprehension, the electric device at which the control panel device 100 such as the control panel device 1300 is installed may be implemented as a refrigerator product such as the refrigerator-freezer, but the present invention is not limited thereto. In addition, the control panel device 1300 can utilize the main part (or the display panel therein) of the control panel device 1300 to display the aforementioned at least one indication corresponding to the aforementioned at least one user input, such as the indications 1305A and 1305B surrounding and/or next to the moveable components 1310A and 1310B, respectively. Examples of the indications 1305A and 1305B may include, but are not limited to: the cooling level indication for indicating the cooling level adjusted by the user regarding the refrigerator within the refrigerator product, and the freezing level indication for indicating the freezing level adjusted by the user regarding the freezer within the refrigerator product. For brevity, similar descriptions for this embodiment are not repeated in detail here.

Figure 14:
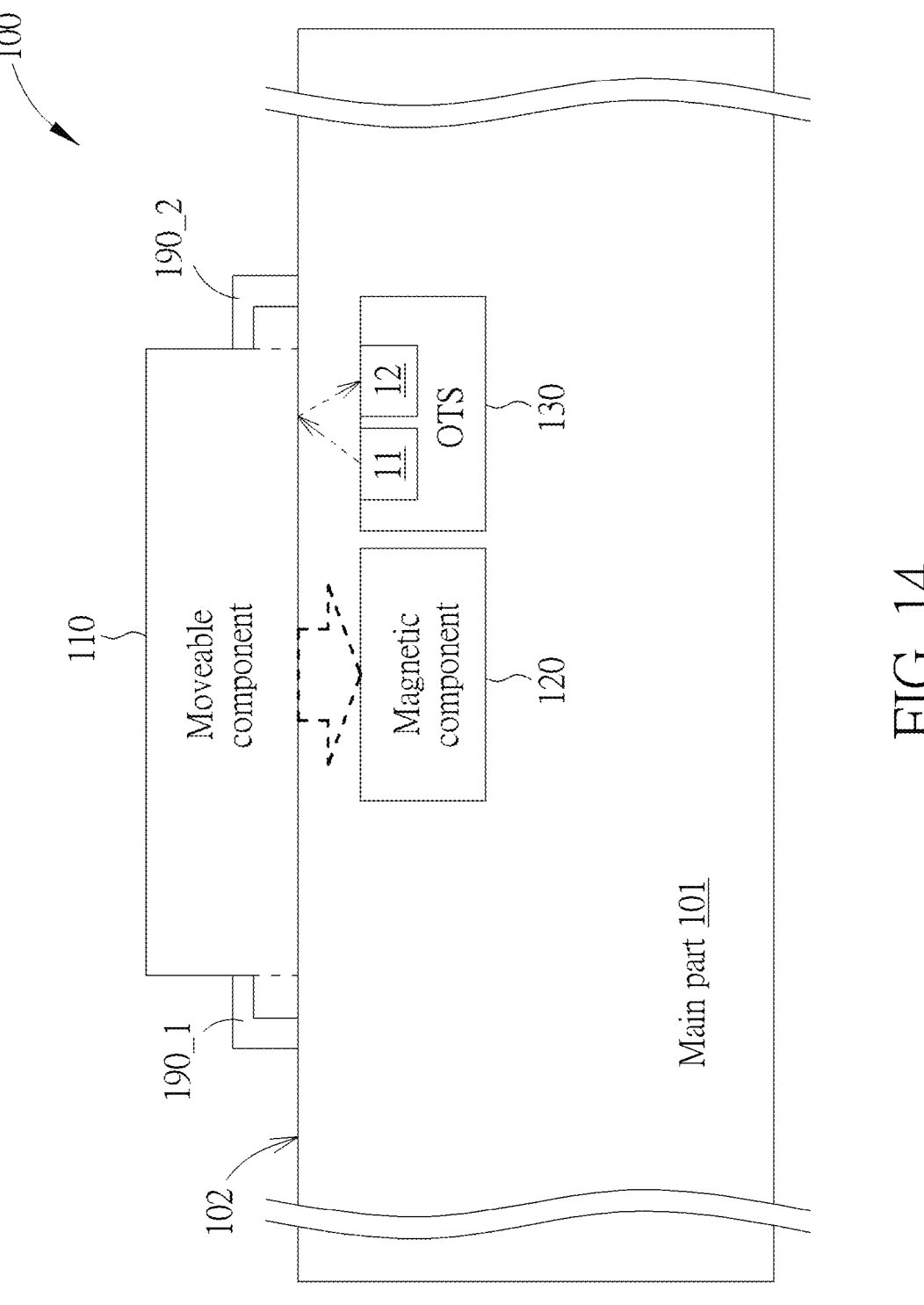
FIG. 14 illustrates a set of locking components of the control panel device shown in FIG. 1 according to an embodiment of the invention.

FIG. 14 illustrates a set of locking components 190_1 and 190_2 of the control panel device 100 shown in FIG. 1 according to an embodiment of the invention. In comparison with the architecture shown in FIG. 1, the control panel device 100 shown in FIG. 14 may further comprise at least one locking component such as the locking components 190_1 and 190_2, for locking the moveable component 110 onto the first surface 102. For example, the moveable component 110 (or the base thereof, such as any base among the bases 611, 811, 911, 1011A and 1011B mentioned above) may comprise at least one locking sub-component corresponding to the aforementioned at least one locking component, such as multiple first extending structures corresponding to the locking components 190_1 and 190_2, for being inserted between respective second extending structures of the locking components 190_1 and 190_2 and the first surface 102 as shown in FIG. 14. When the moveable component 110 is installed onto the main part 101, the moveable component 110 (or the base thereof) may slide to a target location on the first surface 102 and therefore be locked by the locking components 190_1 and 190_2. For example, the base of the moveable component 110 may comprise one or a combination of the aforementioned at least one ferromagnetic material and the aforementioned at least one second magnet. For brevity, similar descriptions for this embodiment are not repeated in detail here.

Figure 15:
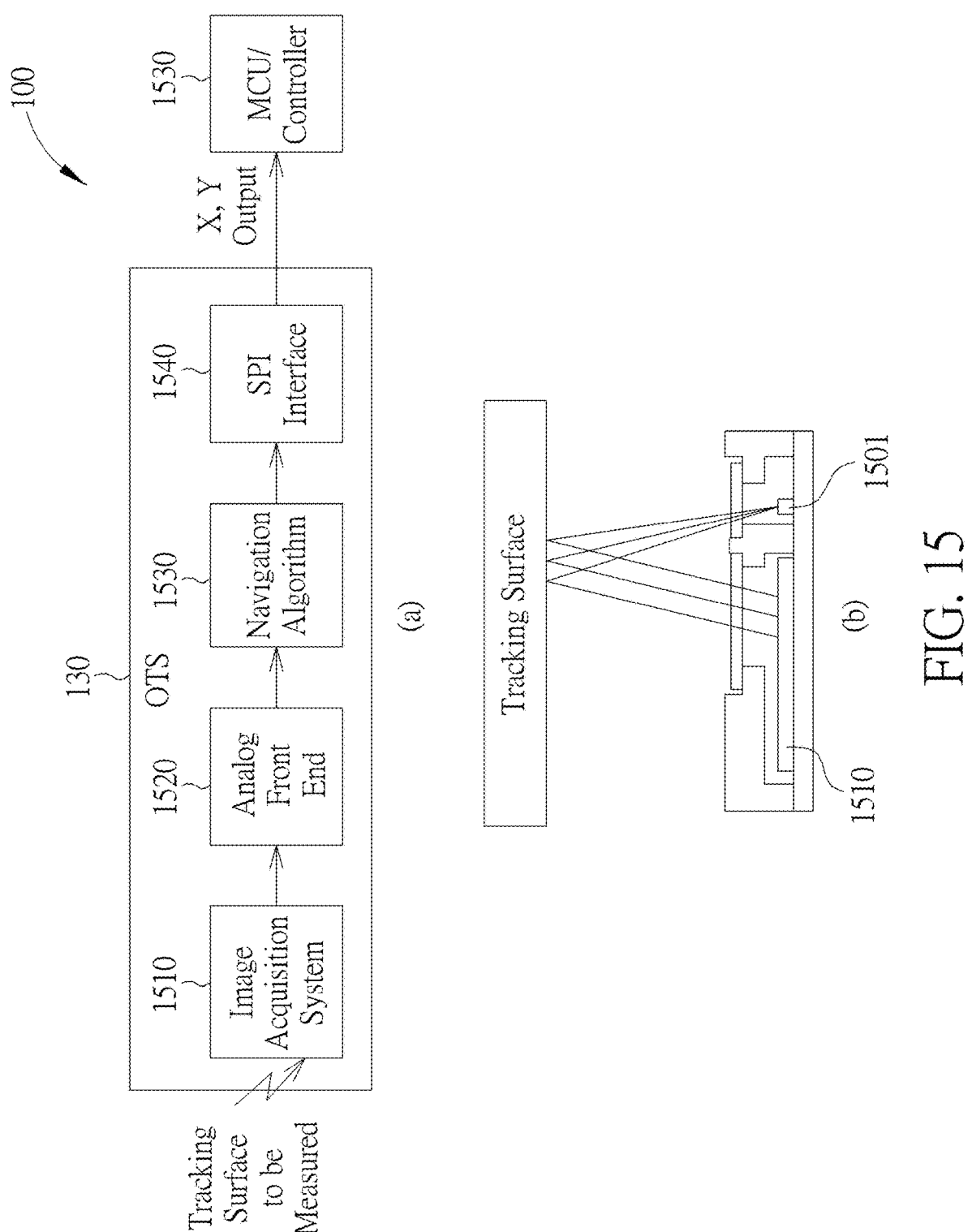
FIG. 15 illustrates, in sub-diagrams (a) and (b) thereof, a schematic diagram and some implementation details of the OTS shown in FIG. 1 according to an embodiment of the invention, respectively.

FIG. 15 illustrates, in sub-diagrams (a) and (b) thereof, a schematic diagram and some implementation details of the OTS 130 shown in FIG. 1 according to an embodiment of the invention, respectively. The OTS 130 (e.g., the new Optical Tracking Sensor (OTS) "PAT9136E1-TXQT" for industrial applications, unleashed as a novel intelligent sensing architecture by PixArt Imaging Inc.) may comprise an image acquisition system 1510, an analog front end circuit 1520, a navigation algorithm circuit 1530 and a serial peripheral interface (SPI) interface 1540, where the laser diode (LD) 1501 and the image acquisition system 1510 can be taken as examples of the light emitting device 11 and the image acquisition device 12 shown in any figure among FIG. 1 and FIG. 14, respectively. The LD 1501 can be implemented as an IR LD to emit IR light for illumination, and the image acquisition system 1510 can be implemented as an advanced CMOS imaging sensor to track the movement of various types of surfaces directly. The analog front end circuit 1520 can receive the signals carrying the optical detection information, for being input into the navigation algorithm circuit 1530 for further processing. The navigation algorithm circuit 1530 can compute the relative position displacement in X and Y to be X and Y output (or "X, Y Output") with respect to the X-axis and the Y-axis on the sensing plane (e.g., a plane parallel to the first surface 102) of the image acquisition system 1510, for being output to the controller (e.g., the MCU) within the control panel device 100. The output (e.g., the relative position displacement) of the OTS 130 may be measured in units of counts per inch (cpi) correlated to the programmable resolution setting, and may have a maximum resolution of up to 20,000 cpi. For example, the output may be in serial data format, easily communicable with the MCU through the SPI interface 1540.

The OTS 130 is suitable for industrial applications, and more particularly, can operate in a wide working range such as the range of 5 to 50 millimeters (mm) from the tracking surface to the OTS 130 and can track at a maximum speed of 5 meters per second (m/s). In comparison with some other relative-position sensors, the OTS 130 implemented with the latest imaging technology can provide higher accuracy in position tracking. For example, when the moveable component 110 is moved or rotated at a fixed speed and is mounted at a fixed height, the OTS 130 can achieve a low, below<1%, resolution output variation. Even with a varying speed or height (while other parameters remain fixed), the resolution variation can still be controlled at around 3%. These can be regarded as the essential parameters to provide a flexible design for various scenarios in the motion-tracking system within the control panel device 100. Additionally, the OTS 130 can work on broad surface coverage, including metal and non-metal surfaces, with varying degrees of working height.

According to the embodiments described above, a method for providing the human-machine interface with aid of the optical detection as shown in FIG. 16 can be applied to the control panel device 100 (e.g., any control panel device among the control panel devices 600, 800, 900, 1000, 1100, 1200 and 1300), and the associated operations of the method may comprise: (Step S11) the control panel device 100 may provide the magnetic component 120 that is positioned below the first surface 102 of the control panel device 100, and the moveable component 110 that is positioned above the first surface 102, where the moveable component 110 is magnetically attracted by the magnetic component 120 to attach to the first surface 102; and (Step S12) the control panel device 100 may utilize the OTS 130 that is positioned below the first surface 102 to sense the movement or rotation of the moveable component 110 as the aforementioned at least one user input in order to generate the aforementioned at least one output corresponding to the aforementioned at least one user input;

where the OTS 130 may comprise the light emitting device 11 and the image acquisition device 12, but the present invention is not limited thereto. According to some embodiments, he associated operations of the method may vary.

Figure 17A:
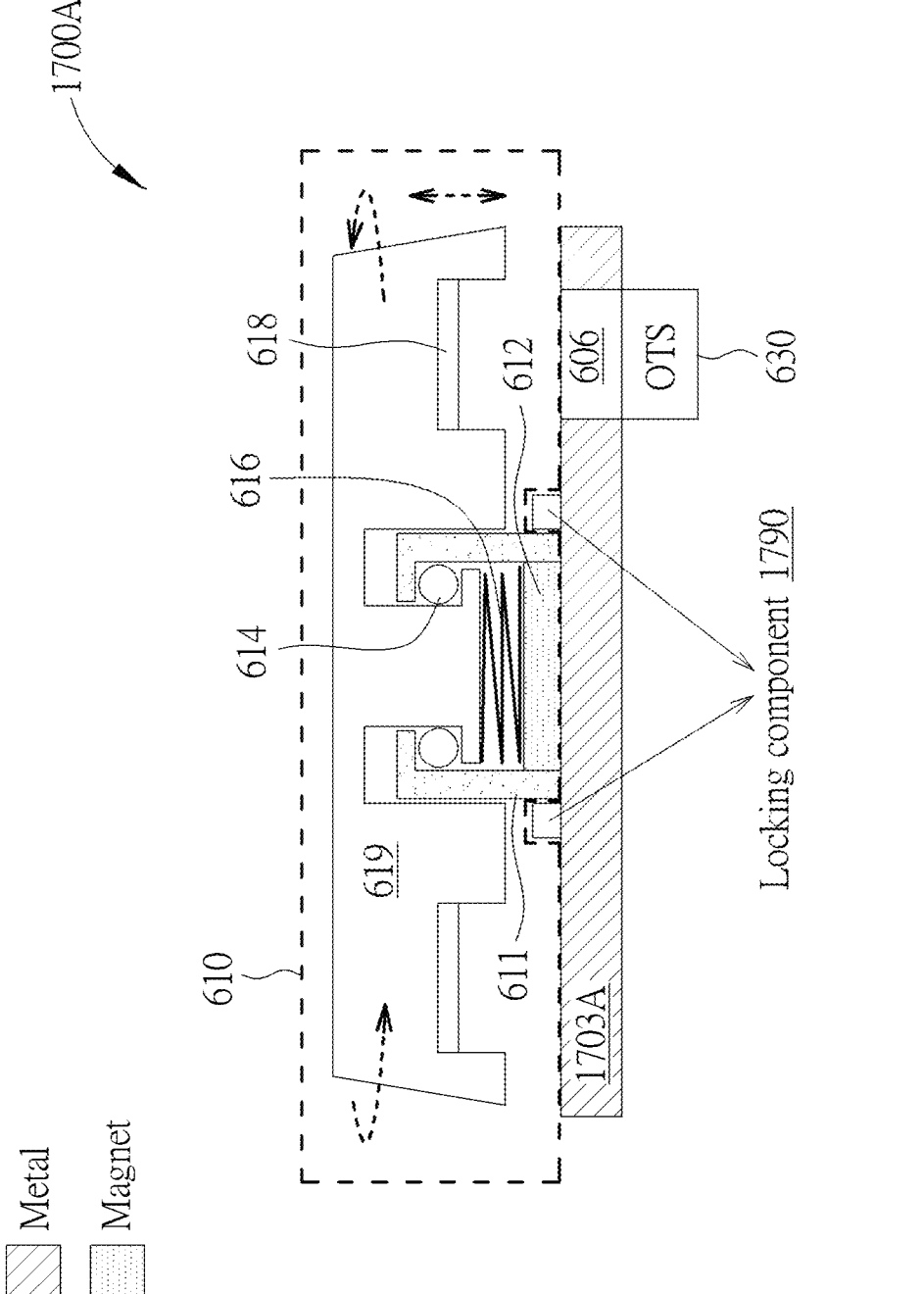
FIG. 17A illustrates a sectional view of the control panel device shown in FIG. 14 according to an embodiment of the invention.

FIG. 17A illustrates a sectional view of the control panel device 100 shown in FIG. 14 according to an embodiment of the invention, where the control panel device 1700A can be taken as an example of the control panel device 100 shown in FIG. 14 for a special case that the magnetic component 120 is simply implemented with metal and that the first and the second extending structures are omitted, and the moveable component 110 such as the moveable component 610 may be implemented as the knob-button. The control panel device 1700A may comprise the moveable component 610, the front panel 1703A and the locking component 1790. In comparison with the control panel device 600 shown in FIG. 6, the first magnet 620 has been replaced by metal in the front panel 1703A of this embodiment, and the locking component 1790 is added onto the front panel 1703A. In addition, the locking component 1790 may be arranged to lock the base 611 of the moveable component 610. For example, the locking component 1790 may be implemented to have a ring shape structure surrounding the base 611, for locking the base 611 at a predetermined location of the moveable component 610 (or the base 611 thereof) on the first surface 102 such as the surface of the front panel 1703A. For brevity, similar descriptions for this embodiment are not repeated in detail here.

Figure 17B:
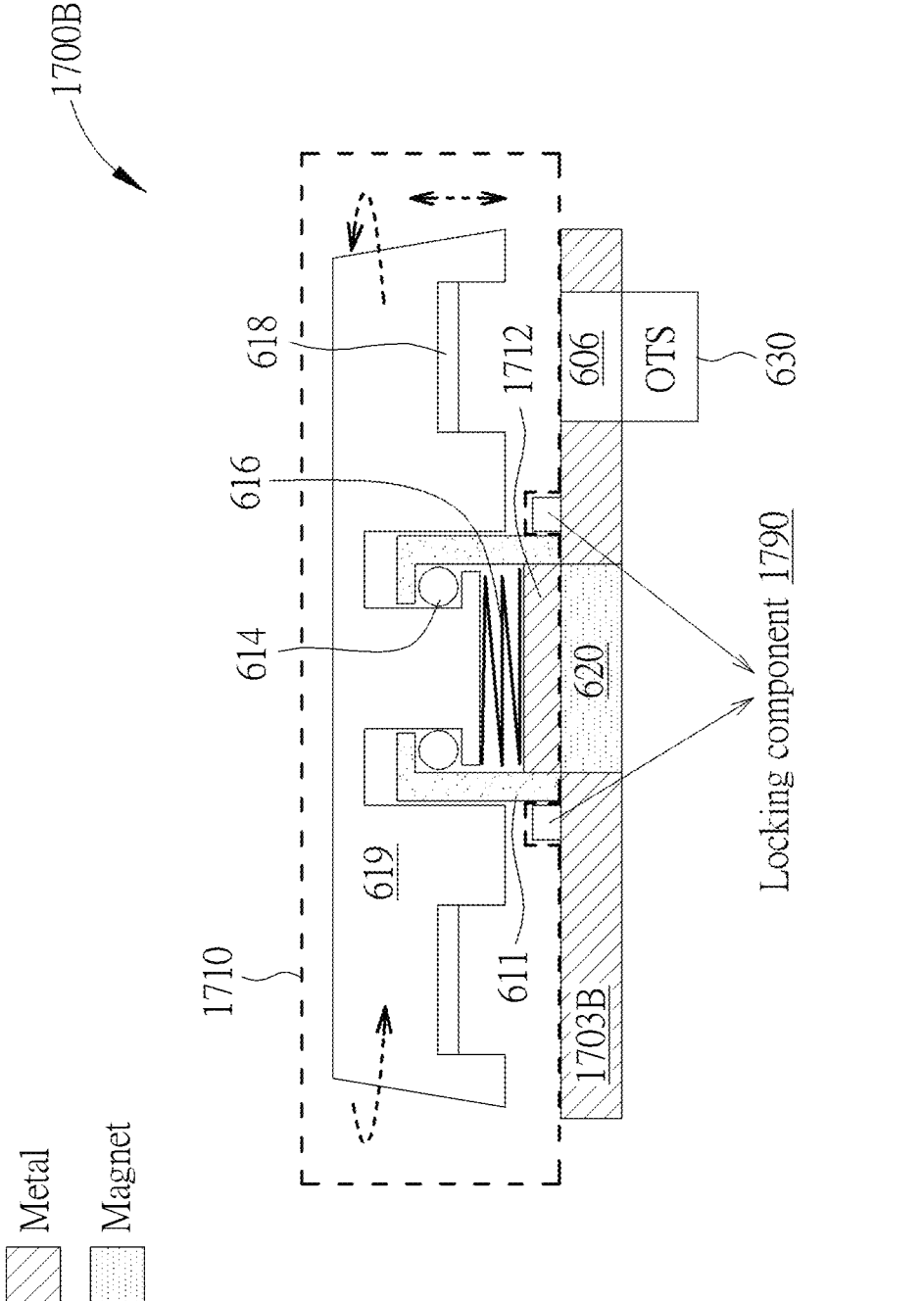
FIG. 17B illustrates a sectional view of the control panel device shown in FIG. 14 according to another embodiment of the invention.

FIG. 17B illustrates a sectional view of the control panel device shown in FIG. 14 according to another embodiment of the invention, where the control panel device 1700B can be taken as an example of the control panel device 100 shown in FIG. 14 for a special case that a magnetic part within the moveable component 110 is simply implemented with metal and that the first and the second extending structures are omitted, and the moveable component 110 such as the moveable component 1710 may be implemented as the knob-button. The control panel device 1700B may comprise the moveable component 1710, the front panel 1703B and the locking component 1790. In comparison with the control panel device 600 shown in FIG. 6, the second magnet 612 has been replaced by metal of the metal structure 1712 in the moveable component 1710 of this embodiment, and the locking component 1790 is added onto the front panel 1703B. In addition, the locking component 1790 may be arranged to lock the base 611 of the moveable component 1710. For example, the locking component 1790 may be implemented to have the ring shape structure surrounding the base 611, for locking the base 611 at a predetermined location of the moveable component 1710 (or the base 611 thereof) on the first surface 102 such as the surface of the front panel 1703B. For brevity, similar descriptions for this embodiment are not repeated in detail here.

According to some embodiments, the control panel device 1700B may further comprise a protection layer (or a protection film) on the surface of the front panel 1703B, for protecting the first magnet 620 integrated into the front panel 1703B. For brevity, similar descriptions for these embodiments are not repeated in detail here.

According to some embodiments, the locking component 1790 shown in any of FIG. 17A and FIG. 17B may be split into multiple locking components 1790. For example, the multiple locking components 1790 may be implemented by dividing the ring shape structure mentioned above into multiple parts and omitting a portion of the multiple parts of the ring shape structure. In some examples, the multiple locking components 1790 may be implemented as three or more parts among the multiple parts of the ring shape structure. For brevity, similar descriptions for these embodiments are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control panel device, for providing human-machine interface with aid of optical detection, the control panel device comprising:
   a magnetic component, positioned below a first surface of the control panel device;
   a moveable component, positioned above the first surface, wherein the moveable component is magnetically attracted by the magnetic component to attach to the first surface;
   an optical tracking sensor (OTS), positioned below the first surface, arranged to sense movement or rotation of the moveable component as at least one user input in order to generate at least one output corresponding to the at least one user input; and
   at least one locking component, extended from the first surface of the control panel device, arranged to lock the moveable component at a predetermine location of the moveable component on the first surface, wherein the at least one locking component has no magnetic force.

2. The control panel device of claim 1, wherein the magnetic component comprises at least one first magnet.

3. The control panel device of claim 2, wherein the at least one first magnet comprises multiple first magnets, wherein the multiple first magnets are arranged according to a first predetermined magnet arrangement pattern.

4. The control panel device of claim 3, wherein the moveable component comprises multiple second magnets, wherein the multiple second magnets are arranged according to a second predetermined magnet arrangement pattern corresponding to the first predetermined magnet arrangement pattern, for aligning the moveable component to a first predetermined direction on the first surface when the moveable component is magnetically attracted by the magnetic component.

5. The control panel device of claim 2, wherein the at least one first magnet comprises a single first magnet.

6. The control panel device of claim 1, wherein at least one portion of the moveable component is moveable with respect to the first surface, for receiving the at least one user input for the control panel device.

7. The control panel device of claim 1,
   wherein the at least one locking component is arranged to lock the moveable component onto the first surface; and
   wherein the moveable component comprises at least one first extending structure corresponding to the at least one locking component, for being inserted between at least one second extending structure of the at least one locking component and the first surface.

8. The control panel device of claim 1, wherein the moveable component comprises:
   a base, magnetically attracted by the magnetic component to attach to the first surface; and
   a moveable sub-component, supported by the base, moveable with respect to the first surface, for receiving the at least one user input for the control panel device.

9. The control panel device of claim 8, wherein the base comprises one or a combination of at least one ferromagnetic material and a set of magnets.

10. The control panel device of claim 8, wherein the moveable sub-component is moveable with respect to at least one axis.

11. The control panel device of claim 10, wherein the moveable sub-component is rotatable with respect to a first axis among the at least one axis.

12. The control panel device of claim 11, wherein the moveable sub-component is pressable along the first axis.

13. The control panel device of claim 11, wherein the moveable sub-component is shiftable along the first axis.

14. The control panel device of claim 10, wherein the moveable sub-component is pressable along a first axis among the at least one axis or along another axis.

15. The control panel device of claim 10, wherein the moveable sub-component is shiftable along a first axis among the at least one axis or along another axis.

16. The control panel device of claim 10, wherein the moveable sub-component is rotatable with respect to a first axis among the at least one axis, and is rotatable with respect to a second axis among the at least one axis.

17. The control panel device of claim 1, wherein the first surface represents a surface of a main part of the control panel device, and the magnetic component and the OTS are positioned within the main part; and the main part is arranged to display at least one indication corresponding to the at least one user input, wherein the at least one output comprises the at least one indication.

18. The control panel device of claim 17, wherein in addition to the magnetic component and the OTS, the main part of the control panel device further comprises a display panel of an electronic device, wherein the at least one indication is displayed on the display panel; and the moveable component is implemented as one or a combination of a knob and a button, for providing at least one corresponding function among knob and button functions with aid of the OTS.

19. The control panel device of claim 17, wherein in addition to the magnetic component and the OTS, the main part of the control panel device further comprises at least one visible light emitting device, wherein the at least one indication is displayed with the at least one visible light emitting device; and the moveable component is implemented as one or a combination of a knob and a button, for providing at least one corresponding function among knob and button functions with aid of the OTS.

20. A method for providing human-machine interface with aid of optical detection, the method being applicable to a control panel device, the method comprising:

providing a magnetic component of the control panel device that is positioned below a first surface of the control panel device, and a moveable component of the control panel device that is positioned above the first surface, wherein the moveable component is magnetically attracted by the magnetic component to attach to the first surface;

utilizing an optical tracking sensor (OTS) of the control panel device that is positioned below the first surface to sense movement or rotation of the moveable component as at least one user input in order to generate at least one output corresponding to the at least one user input; and utilizing at least one locking component that is extended from the first surface of the control panel device to lock the moveable component at a predetermine location of the moveable component on the first surface, wherein the at least one locking component has no magnetic force.

\* \* \* \* \*